(12) United States Patent
Reichinger et al.

(10) Patent No.: US 8,515,229 B2
(45) Date of Patent: Aug. 20, 2013

(54) PROCESS AND APPARATUS FOR THE PRODUCTION OF AN ELASTOMERIC OPTICAL CONDUCTOR FIBER AND OPTICAL CONDUCTOR FIBER

(75) Inventors: Gerhard Reichinger, Rednitzhembach (DE); Simone Streit, Schwabach (DE); Markus Stallwitz, Rednitzhembach (DE); Stefan Schipke, Rosstal-Grossweissmannsdorf (DE)

(73) Assignee: Leoni Bordnetz-Systeme GmbH, Nuremberg (DE)

( * ) Notice: Subject to any disclaimer, the term of this patent is extended or adjusted under 35 U.S.C. 154(b) by 563 days.

(21) Appl. No.: 12/671,170

(22) PCT Filed: Jul. 25, 2008

(86) PCT No.: PCT/EP2008/006101
§ 371 (c)(1),
(2), (4) Date: Sep. 14, 2010

(87) PCT Pub. No.: WO2009/015825
PCT Pub. Date: Feb. 5, 2009

(65) Prior Publication Data
US 2010/0329629 A1  Dec. 30, 2010

(30) Foreign Application Priority Data
Jul. 28, 2007 (DE) .......................... 10 2007 035 419

(51) Int. Cl.
*G02B 6/44* (2006.01)
(52) U.S. Cl.
USPC .............................. 385/100; 65/385; 264/1.29

(58) Field of Classification Search
USPC .......................................... 65/385; 264/1.29
See application file for complete search history.

(56) References Cited

U.S. PATENT DOCUMENTS

| 4,125,644 A | 11/1978 | Ketley et al. |
| 4,416,601 A | 11/1983 | Hasegawa et al. |
| 4,830,461 A | 5/1989 | Ishiharada et al. |
| 4,937,029 A * | 6/1990 | Ishiharada et al. ............ 264/1.27 |
| 5,391,154 A * | 2/1995 | Young ...................... 604/167.05 |
| 5,942,020 A * | 8/1999 | Marcelissen .................... 65/530 |
| 6,057,034 A * | 5/2000 | Yamazaki et al. ............. 428/378 |
| 6,829,420 B2 * | 12/2004 | Matsuyama et al. .......... 385/109 |
| 2005/0058420 A1 | 3/2005 | Inui et al. |

FOREIGN PATENT DOCUMENTS

| DE | 3844604 C2 | 8/1996 |
| EP | 0066659 A1 | 12/1982 |
| GB | 2155357 A | 9/1985 |
| JP | 1224701 A | 9/1989 |

* cited by examiner

*Primary Examiner* — Uyen Chau N Le
*Assistant Examiner* — Chad Smith
(74) *Attorney, Agent, or Firm* — Laurence A. Greenberg; Werner H. Stemer; Ralph E. Locher

(57) ABSTRACT

A method of producing an elastomeric optical conductor fiber composed of plastic includes drawing a fiber composed of a high-viscosity liquid reactive starting material. The starting material is added by way of a nozzle to a reaction apparatus, to which a liquid, which is inert towards the starting material, has been charged. At least partial crosslinking of the starting material takes place in the reaction apparatus. The elastomeric plastic of the optical conductor fiber is in particular a three-dimensionally crosslinked polyurethane.

28 Claims, 4 Drawing Sheets

PROCESS AND APPARATUS FOR THE PRODUCTION OF AN ELASTOMERIC OPTICAL CONDUCTOR FIBER AND OPTICAL CONDUCTOR FIBER

BACKGROUND OF THE INVENTION

Field of the Invention

Such an optical fiber is disclosed, for example, by DE 101 45 945 A1. The optical fiber described therein comprises a light-guiding core of a crosslinked polysiloxane, which is surrounded by a sheath. Cited as an advantage over the previously usually used optical fibers of plastic (POF, Plastic Optical Fibers), are the much improved temperature resistance, good extensibility, low stress cracking tendency and high chemical resistance. The automobile sector is given in particular as an area where such optical fibers are especially used.

However, it has been found that the production of such elastomeric optical fibers with good optical and mechanical properties is complex and cost-intensive.

BRIEF SUMMARY OF THE INVENTION

The invention is therefore based on the object of providing a process and an apparatus with which an elastomeric optical fiber can be produced with consistently good quality at low cost. The invention is also based on the object of providing an optical fiber which can be produced with high quality and at low cost.

The object related to the process is achieved according to the invention by a process for producing an elastomeric optical fiber of plastic in which a fiber is drawn from a viscous reactive starting material and the starting material is crosslinked, the starting material being passed on by way of a die into a reaction device, which is filled with a liquid that is inert with respect to the starting material, and at least partial crosslinking of the starting material taking place in the reaction device.

After the viscous starting material emerges from the die, gravitational force is preferably used, so that the starting material moves downward in the reaction device under its own weight. On account of its viscous consistency, a continuous elongate filament thereby forms. Of particular importance is the liquid surrounding the fiber, which makes it possible for the fiber to be produced in a controlled and uniform manner. Preferably used as the liquid for this is an oil which has, in particular, a lower density than the viscous starting material. Therefore, the viscous material is, as it were, slowed down by the liquid, so that a suitable falling rate is obtained. With a practicable falling height in the range of a few meters, for example, this slow falling rate creates sufficient time to activate the crosslinking reaction, so that at the end of the reaction device there is already a partially crosslinked fiber, which for further processing can be subjected to mechanical loading until the fiber is finally in the finished form of an optical fiber and is preferably completely crosslinked. At the end, the elastomeric optical fiber is formed. Elastomeric is understood here as meaning of rubber-elasticity. The elongation at break here is preferably over 100% with respect to the unextended state at room temperature. This rubber-elasticity is essentially determined by the crosslinking. This is a spatial chemical crosslinking. The crosslinking of the individual polymer chains is comparatively loose, so that the material has the desired elasticity above its glass transition temperature and is not brittle. One particular advantage of this elastomeric optical fiber is to be seen in the high operating temperature range, allowing such optical fibers also to be used in a thermally demanding environment, for example in a motor vehicle.

The elastomeric optical fiber is formed in particular without a reflection or cladding layer surrounding the fiber and is used for applications that exploit the evanescent effect, as envisaged for example in the case of a pressure sensor disclosed by WO 03/069294 A1. In the case of this pressure sensor, the cladding-free optical fiber, that is to say a fiber without a sheath or outer coating, is, in particular, guided loosely in a surrounding tubular sheath. When exposed to pressure, the sheath is pressed against the optical fiber, so that the optical waves propagating in the optical fiber are disturbed. This is detected as a pressure signal. Such a pressure sensor is suitable, for example, as a pinch-preventing means for motor-adjustable closing mechanisms such as windows or doors.

Viscous is understood here as meaning a viscosity of, in particular, between 500 and 50 000 mPas at room temperature. The reactive starting material is therefore of medium to high viscosity.

In order to avoid crosslinking before emergence from the die, the reactive starting material is preferably cooled to a temperature below room temperature, and in particular to a temperature<0°.

In order to initiate the crosslinking reaction, the liquid in the reaction device expediently undergoes temperature control, for example is controlled to an elevated temperature in the range between 40° and 60° C. The liquid is preferably regulated to a substantially constant filling level within the reaction device.

The reactive starting material is expediently made up of a number of reactive starting components, which are mixed together in a predetermined composition in a metering device. Here, the die forms part of the metering device. In order as far as possible to avoid the crosslinking reaction occurring within the metering device and in the region of the die, according to a preferred refinement temperature control, that is cooling, of the metering device, and in particular of the die, is provided.

With regard to the desired continuous production process, only partial crosslinking takes place within the reaction device, in such a way that the fiber can be further processed mechanically, for example by drawing, etc. Before the partially crosslinked fiber can be subjected to mechanical loading, this fiber, preformed by way of the die, achieves a gel-like state in a defined spatial window within the reaction device. In this state, the fiber can be geometrically influenced. This is then advantageously used to the effect that, in this window, the fiber is brought into its desired final form, in particular by drawing. By setting the drawing rate and/or the rate of emergence of the starting material from the die, the fiber is drawn to the desired final diameter—preferably without further mechanical or other shaping measures.

A diaphragm through which the fiber is drawn in the end region of the reaction device is expediently provided in order to avoid running out of the liquid. The diaphragm surrounds the fiber in the manner of a closely fitting sleeve. Here, the diaphragm can advantageously be dynamically set. The possibility of dynamic setting allows, in particular, the closing force with which the diaphragm comes to lie against the fiber to be set. For this purpose, the diaphragm is expediently formed as an elastically deformable tube which can be subjected to pressure from the outside.

After the diaphragm, the fiber, which is already able to undergo mechanical loading, is drawn off through a belt drawing device and transported further. For this purpose, it is gripped by two counter-circulating belts with its smooth surface and is drawn further. It is particularly important here for the fiber to be gripped as gently as possible, in order as far as possible to avoid damage to the surface, and consequently impairment of the optical properties. After the diaphragm, the fiber is preferably still wetted with the liquid, and therefore as it were surrounded by a protective film.

Finally, the partially crosslinked fiber is also subjected to a number of post-processing stages or a maturing process. For this purpose, the fiber is, in particular, post-crosslinked, cleaned of the residual liquid and finally wound up and, in particular, also stored for final crosslinking. For this purpose, it is provided in expedient refinements that the fiber is drawn through a heated bath for further crosslinking. Alternatively, irradiation, etc., may also be provided for the post-crosslinking. For cleaning the fiber of the liquid, it may in turn be drawn through a preferably heated cleaning device, in which the fiber is treated with cleaning fluid. The cleaning device here comprises a number of stages, in particular a first stage, in which an alkaline cleaning liquid is used, and a second cleaning stage, in which cleaning is performed with water. In the cleaning device, the cleaning liquid preferably flows over the fiber and is, in particular, continuously circulated. The fiber is therefore bathed with the fluid. To increase the cleaning effect, this preferably takes place additionally under the effect of ultrasound. After the cleaning stage the drying follows, taking place in particular under negative pressure (a vacuum). Finally, the fiber, which is then preferably rolled up as in meter lengths or as a continuous product, is stored, in particular under a protective atmosphere, until it is completely crosslinked. This is referred to as a maturing process, during which further drying may also be provided. The maturing process results in an economically efficient continuous production process.

The procedure described here is suitable in particular for a continuous, low-cost production of elastomeric optical fibers, including in industrial operation. The individual steps ensure the formation of a high-quality optical fiber and at the same time an economical method of production. In particular, the various treatments of the fiber at the different crosslinking stages are, in technical terms of the process, not only very easy and reproducible but also efficient, since, for example, the subsequent maturing process makes it possible to set a comparatively high drawing rate because complete crosslinking is delayed until the maturing process.

According to an alternative production variant, the crosslinking takes place with the aid of laser light, this being introduced into the starting material longitudinally in the die, so that said material crosslinks. In the case of this production variant, the arrangement of a reaction device filled with liquid is not required. This is so because, on account of the comparatively high level of energy that is introduced, a very rapid crosslinking reaction occurs, so that the completely crosslinked optical fiber is formed very quickly. It is of particular importance here that the optical waveguide is arranged within the die for the introduction of the laser light, so that the laser light is, as it were, coupled into the viscous starting material coaxially at the die outlet. The crosslinking therefore begins directly at the die outlet, but not before. The two production variants may also be combined with each other, for example the crosslinking reaction in the case of the first variant can be speeded up by irradiation.

The processes described are suitable for producing elastomeric optical fibers from various reactive starting materials. Investigations have shown, however, that the processes described for low-cost production of elastomeric optical fibers of a required high quality can be obtained if a reactive, spatially crosslinkable polyurethane system is used as the starting material. Such an elastomeric PU fiber can be produced easily in technical terms of the process and has good optical properties. Here, the polyurethane system may be a one-component system or a two-component system.

The crosslinking reaction here is expediently a polyaddition reaction of two functional groups. One particular advantage of the polyaddition reaction is to be seen in that no decomposition products or byproducts that could, for example, disturb the optical light guidance are released. In the case of a two-component polyurethane system, this comprises a polyol as the first component and a crosslinking agent (curing agent), in particular a polyisocyanate, as the second component. In the case of this system, a hydroxyl group (OH) of a polyol bonds with an isocyanate group (NCO) of the polyisocyanate, as functional groups, with the formation of a urethane group. Preferably used is aliphatic polyisocyanate, which exhibits good properties with regard to thermo-oxidative aging at relatively high temperatures.

Polyol oligomers of a comparatively low molecular weight (<10 000 daltons) are preferably used as the polyol. The functional hydroxyl groups are, in particular, terminal, that is to say at the end of the polymer chain, and are preferred primarily on account of the desired high reactivity. The elastic properties of the polyurethane are mainly influenced by the polyol component. Therefore, polyols with two or three hydroxyl groups per molecule (bivalent or trivalent polyols) are preferably used for the formulation/mixing of an elastic, three-dimensionally crosslinked polyurethane. The restriction to a maximum of three hydroxyl groups achieves the effect of the desired loose crosslinking, which is ultimately decisive for the elastomeric property. A greater number of hydroxyl groups leads under some circumstances to a crosslinking density that is too high, which may result in brittle to thermosetting properties. In principle, small amounts of high-valence or low-valence, short-chain, branched or linear polyols may also be admixed in order to set the material properties suitably. Low amounts are understood as meaning a proportion<25% and preferably<10%. The predominant proportion (>75%, in particular>90%) of the polyol component is preferably made up of trivalent polyols.

As an alternative or in addition to the use of trivalent polyols, the desired three-dimensional network structure is preferably also supported by polyisocyanates (curing agents) with up to three isocyanate groups, that is to say so-called trivalent isocyanates.

To achieve the desired three-dimensional network structure, the following material combinations can be used in particular:

A) branched polyisocyanate+linear polyol
B) branched polyol+branched polyisocyanate
C) linear diisocyanate or polyisocyanate+branched polyol Linear polyols are usually wax-like at room temperature and, in technical terms of production, can only be used to a restricted extent. For a process that proceeds in a cooled environment after the mixing operation, they are therefore less suitable (re A).

In the case of the combination B), the "double branching" gives rise to the risk of more crosslinking defects. It is therefore preferable to add somewhat more polyisocyanate, which can subsequently set by means of atmospheric moisture. The advantage of this combination is to be seen in that it uses branched polyols with low molecular weight, which have an average viscosity (2000-4000 mPas) at room temperature, that is to say are still viscous and can still be conveyed and mixed even in the preferred process described here at −10°

C./−20° C. This material combination is preferably used in the case of the production process described below with reference to FIG. 1.

Also in the case of the polyisocyanates there is in comparison with the monomeric diisocyanates not only the work-hygiene aspect (monomeric diisocyanates are usually classified as toxic) but also in addition the gain in functionality. Diisocyanates are transformed into polyisocyanates by way of various types of reaction, and then have a functionality of greater than two (valence>2) necessary for spatial crosslinking. Apart from the higher functionality>2, an advantage of polyisocyanates is the higher viscosity (about 10 000 mPas, HDI-based polyisocyanate), allowing the polyisocyanate to be processed directly without complex pretreatment in the preferred process described with reference to FIG. 1.

With regard to the desired use as an optical fiber, it is expediently provided that the starting material is completely crosslinked, therefore that there is stoichiometric crosslinking and, as far as possible, no defects are formed. Such defects may under some circumstances have adverse effects on the optical properties. Such defects also adversely influence the aging resistance.

In particular in order to achieve crosslinking that is as complete as possible, a mixture of low molecular weight polyols with higher molecular weight polyols is used as the polyol. The low molecular weight polyols have a higher mobility and can therefore post-crosslink initially formed defects in the manner of a post-crosslinking agent.

According to an expedient refinement, the components are mixed superstoichiometrically and an additional reactive crosslinking agent is added. In particular, for example, the surface of the fiber is subsequently fluorinated, in order, for example, to form a so-called cladding layer.

To speed up the crosslinking reaction, a catalyst is preferably admixed, to be precise in particular in the range from approximately 0.3% by weight to 1% by weight with respect to the proportion of the polyol component. Catalysts such as organic or inorganic tin catalysts and others, or mixtures of these, are used, in particular, as catalysts for polyurethane casting resin systems.

In order as far as possible to prevent thermo-oxidative degradation, a suitable additive is preferably admixed, in particular in the range from approximately 1 to 5% by weight with respect to the proportion of the polyol component.

In order to prevent crosslinking before the actual desired reaction phase after emergence from the die, it is expediently provided that at least one of the functional groups is blocked. This has the effect, for example, that cooling of the die is futile.

The molecular ratio of the functional groups NCO:OH is expediently set in the range between 1.3:1 and 0.9:1. A ratio of 1.1:1 has been found to be particularly suitable.

The object with regard to the apparatus is achieved according to the invention by an apparatus for producing the elastomeric optical fiber which comprises a metering device with a die for the viscous and reactive starting material. The apparatus also has a reaction device, which is arranged after the die, preferably in a vertical direction, and is filled with a liquid that is inert with respect to the starting component. The advantages cited with regard to the process and preferred refinements can also be applied analogously to the apparatus.

In an alternative or advantageous refinement, it is provided according to the invention that a light guiding element for introducing laser light coaxially in relation to the die is arranged in the die for a crosslinking reaction.

The object cited with regard to the optical fiber is finally achieved according to the invention by an optical fiber which consists of an elastomeric plastic, this being a three-dimensionally crosslinked polyurethane. Here, too, it is the case that the advantages cited with regard to the process and preferred refinements can also be applied analogously to the optical fiber with regard to the chemical composition thereof.

It has been found that such a polyurethane-based system (PU system) allows greatly simplified process control during production, and moreover also altogether better properties with regard to the light guidance, in comparison with other plastics systems, such as for example polysiloxane systems.

With regard to the process control, it should, in particular, be emphasized with respect to the polyurethane-based systems that the crosslinking reaction can be set in such a way that it takes place over a comparatively great time period. This makes it possible, in technical terms of the process, to set the geometry of the fiber in the desired way. In technical terms of production, the production variant with the aid of the reaction device that is described above with regard to claim 1 is designed especially for such a PU system.

Furthermore, in technical terms of the process, the starting components can be reliably and dependably mixed homogeneously in the case of the PU system, in order overall to achieve consistent fiber properties. In the case of other plastics systems, a greater effort is required for this or, on account of mixing difficulties, higher attenuation values may be established in the fiber forming.

Furthermore, the PU systems are also distinguished by the fact that the viscosity necessary for the process can be set in wide ranges, for example by pre-crosslinking. This allows the way in which the process proceeds, and consequently the properties of the fibers forming, to be actively influenced in an easy way.

In comparison with silicone materials, for example, a greater hardness of the fibers can also be set with polyurethane systems, without the optical properties of said fibers significantly deteriorating.

Overall, a wide range of suitable material properties is made possible in the case of the PU systems. This is so because, in a way similar to in a modular system, the starting components that are usually used in the case of the PU systems, in particular polyols and polyisocyanates, can be differently mixed together in wide ranges in order to achieve different material properties. The particular advantage of the PU systems can be seen in that the optical properties are only affected under certain limited conditions and there is no material segregation or turbidity.

The electrostatic insensitivity in the case of a fiber based on a PU system is also of particular advantage. By contrast, a silicone fiber, for example, becomes electrostatically charged, as a result of which dirt particles are attracted, which in turn can lead to light being coupled out and the attenuation increasing. Against this background, the fiber based on the PU system is therefore particularly suitable for an application exploiting the evanescent field effect, in which the fiber is formed without sheathing/cladding. This is so, in particular, because there is also the possibility of cleaning the fiber comparatively easily during or after the production process, in order to have a high-quality fiber available specifically for evanescent field applications.

Finally, the comparatively high refractive index of 1.55 should be emphasized, as compared, for example, with the refractive index of 1.375 in the case of a silicone fiber. If the fiber is to be surrounded by a sheath/cladding, which generally must have a lower refractive index, in the case of a PU fiber there are many suitable materials for the cladding. By contrast, in the case of a silicone fiber, only a very restricted choice of material would be possible.

Exemplary embodiments of the invention are explained in more detail below on the basis of the figures, each of schematic, simplified representations, in which:

DESCRIPTION OF THE INVENTION

In the figures, parts with the same effect are provided with the same designations.

Figure 1:
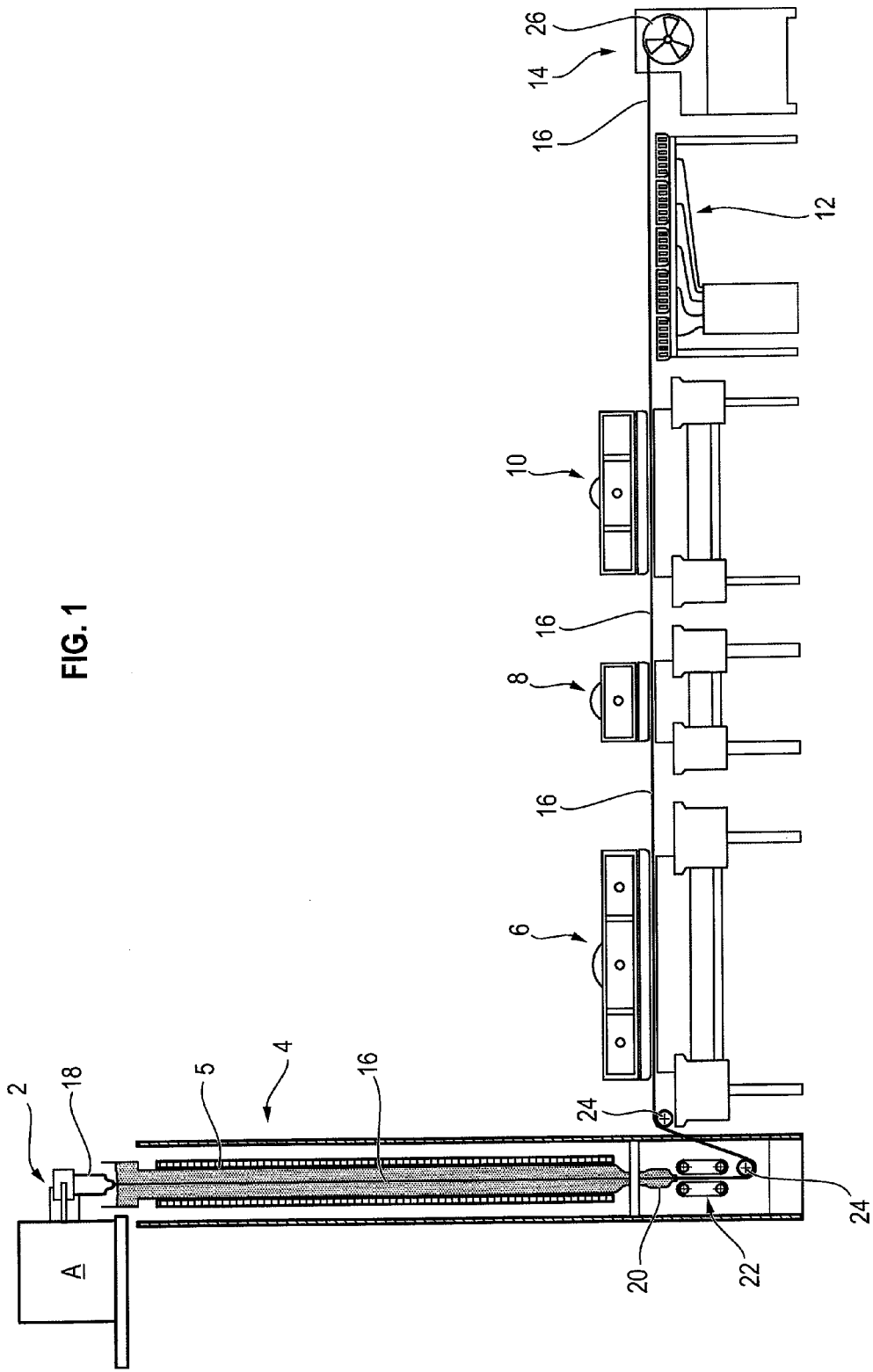
FIG. 1 shows an overall representation of an apparatus for producing an elastomeric optical fiber.

To produce an elastomeric, three-dimensional optical fiber from plastic, the apparatus or installation that is represented in FIG. 1 comprises a metering device 2, a drawing tower 4, in which a column-like tank 5 filled with oil is arranged as a reaction device, a post-crosslinking device 6, a first cleaning device 8 and a second cleaning device 10, a drying device 12 and a winding-up device 14. The individual devices are arranged one after the other and are passed through one after the other by a fiber 16 forming.

In the metering device 2, the mixing and metering of the reactive starting material A takes place, which material is viscous and is forced with the aid of the metering device 2 through a preferably temperature-controlled die 18 of the metering device, so that after the die 18 there forms a continuous, viscous fiber, which falls downward within the drawing tower 4 under its own weight. On account of its viscosity, the viscous starting material A thereby forms a self-forming continuous, uninterrupted fiber strand. To set the viscosity of the starting material A, said material, or its individual components, are preferably subjected to pre-crosslinking, that is to say pre-polymerization.

Within the drawing tower 4, a first crosslinking of the starting material A takes place, so that at the end of the drawing tower 4 the fiber 16 can already undergo mechanical loading. The fiber 16 thereby runs through the heated oil in the tank 5 and, in the lower region, is drawn off out of the tank 5 through a diaphragm 20 with the aid of a belt drawing device 22. The fiber 16, partially crosslinked and able to undergo mechanical loading, is deflected by way of deflecting rollers 24 and fed to the following post-crosslinking device 6. This is formed by a reservoir, which is likewise filled with oil and is heated, for example to 60° C. The temperature-controlled oil brings about further crosslinking of the fiber 16. The oil therefore acts in the manner of a supporting liquid for shaping and maintaining the shape of the fiber 16 forming. A synthetic oil or a natural oil (mineral oil, paraffinum liquidum) is used as the oil. The oil may also be a fluorinated oil.

After the drawing tower 4, the fiber 16 runs through the post-crosslinking device 6, which is formed in the manner of a bath, which is run through by the fiber 16. A liquid medium, namely an inert mineral oil or vegetable oil, is therefore preferably likewise used in this device 6. Alternatively, water may also be used.

The fiber 16 is subsequently made to pass into the first cleaning device 8. Here, the fiber 16 is preferably rinsed with a preferably alkaline cleaning solution under the effect of ultrasound and is freed of the oil. Finally, in the second cleaning device 10, the residues of the cleaning solution are removed, for example in a way similar to in the first cleaning device 8, also with the aid of ultrasound and with water, preferably distilled water. In both cleaning devices 8, 10, the cleaning liquid is preferably heated, in order to support further crosslinking.

After the cleaning device 10, the fiber 16 finally runs through the drying device 12. The drying takes place, for example, by means of infrared radiant heaters. The thermal irradiation in turn supports the post-crosslinking. Finally, the fiber 16 is wound up with as little tension as possible onto a reel 26 in the winding-up device 14. At this point in time, the fiber 16 is still in a not completely crosslinked state. The wound-up fiber 16 is therefore also subjected to a subsequent maturing process, as it is known, during which further drying and further crosslinking take place. The drying takes place here in turn at an elevated temperature in the range of, for example, 50° C. and preferably under negative pressure. During this maturing time period, which lasts several hours or days, the reel 26 is stored under a protective atmosphere or, for example, protected from atmospheric oxygen by airtight packaging, such as for example by being welded in.

Figure 2:
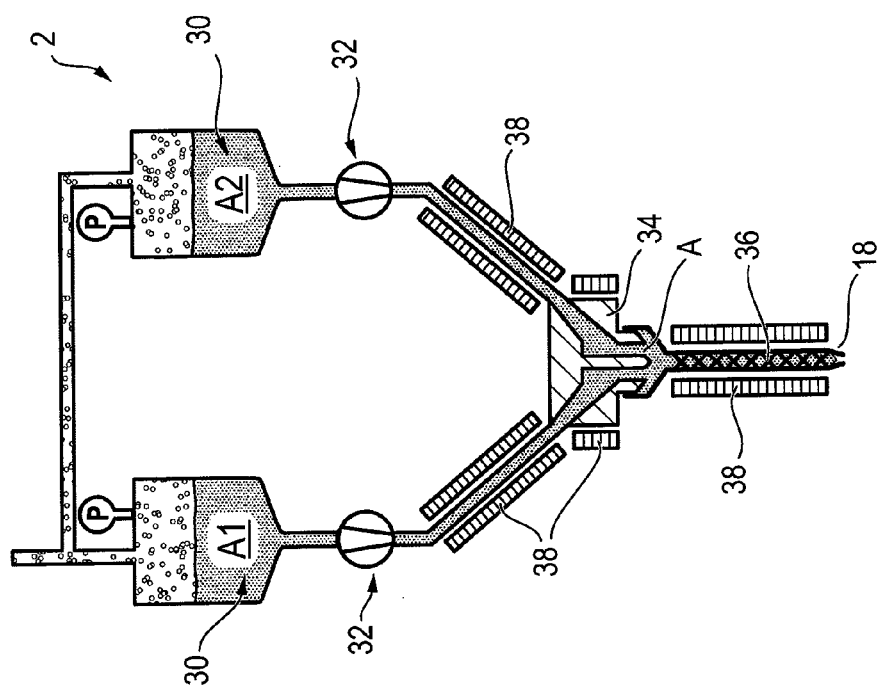
FIG. 2 shows a detailed representation of a metering device.

The structure of the metering device 2 is described in detail below with reference to FIG. 2. According to this, the metering device 2 comprises two storage tanks 30, stored in which are two reactive components A1, A2, which are mixed together to form the reactive starting material A. The two reactive components A1, A2 are preferably the two components of a two-component polyurethane system, namely on the one hand a polyol (resin) and on the other hand a crosslinking agent (curing agent), in particular a polyisocyanate. Here, the polyol is already provided with a catalyst and preferably with a supplementary additive against thermo-oxidative degradation.

The two storage tanks 30 are subjected to pressure by way of a pressure system. For this purpose, the two storage tanks 30 are subjected to pressure by way of a system of pressure lines with an inert gas, such as for example argon. Connected after the two storage tanks 30 there is in each case a metering pump 32 for delivering the viscous starting components A1, A2. The two starting components are subsequently brought together in a metering head 34 and subsequently mixed homogeneously together in a mixer 36, before they reach the die 18 as reactive starting material A, from which die a preformed fiber strand then emerges.

In the case of the metering device 2 represented, temperature-controlling devices 38 are located at several points, in order to cool the reactive starting components A1, A2, to be precise preferably to a temperature in the range of −10° C., in order to avoid crosslinking already occurring within the metering device 2. As an alternative or in addition, it may be provided here that at least one of the reactive components or one of the functional groups effective for the crosslinking is blocked, so that initially no crosslinking takes place. By way of the two metering pumps 32, highly accurate metering of the two starting components A1, A2 takes place in the desired mixing ratio. The pressurization of the two storage tanks 30 has the purpose of avoiding voids or cavities, so that metering is always performed in the desired ratio.

Figure 3:
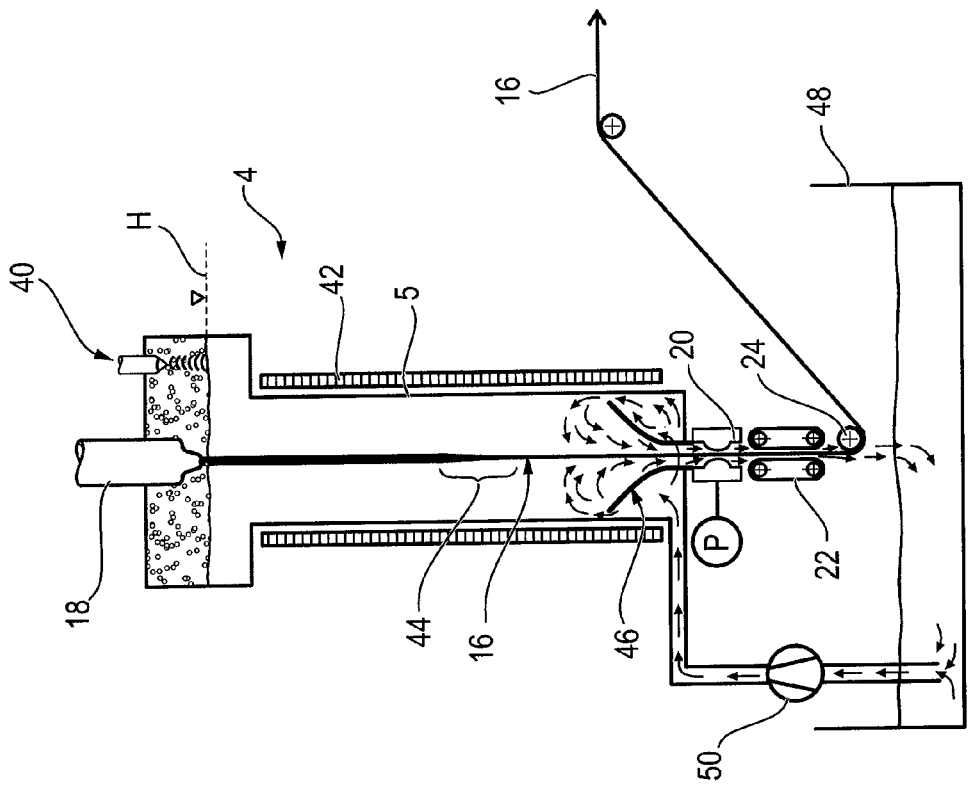
FIG. 3 shows a detailed representation of the apparatus according to FIG. 1 in the region of a vertical reaction device filled with oil.

The structure of the drawing tower 4 is revealed by way of example by FIG. 3 in particular. The fiber 16 leaving the die enters oil, the filling level H of which is regulated to just below the die outlet. In the region of the die head, purging with an inert gas (argon) takes place, in order to avoid a reaction with atmospheric oxygen. The filling level H is monitored with the aid of a level sensor 40. The fiber 16 emerges from the die 18 with a diameter that is greater than the desired final diameter. The oil is arranged within the cylindrical tank 5, which widens toward the die 18. The die 18 enters this upper head region of the tank 5 almost as far as the filling level. The tank 5 has a heating device, which in the exemplary embodiment is formed as a heating jacket 42, which regulates the oil to a desired setpoint temperature. The temperature is set here in such a way that, at the end of the tank 5, the fiber 16 has already reached a partially crosslinked state, so that the fiber 16 can be fed to the further treatment steps by way of mechanical transport. The temperature is set here to 45° C., for example. With increasing distance from the die 18, therefore, the degree of crosslinking increases noticeably.

The temperature and the length of the tank are then set such that the fiber 16 achieves a gel-like consistency within the tank 5. This region is referred to as the gelling region 44. Spatially ahead of the gelling region 44, the fiber 16 is still viscous, after that it is substantially solid. It is therefore made possible for the fiber 16 to be drawn off downward in the lower region by way of the belt drawing device 22. By this drawing off at a defined drawing-off rate, the fiber 16 is drawn to the desired final diameter in the gelling region 44, in which it can still be geometrically formed. The final diameter can therefore be set not only by the dosing rate but also by the drawing-off rate.

The fiber 16 already drawn to the required dimensions is subsequently drawn through the diaphragm 20 out of the tank 5 by way of an outlet lock 46. The diaphragm 20 acts as a separating or retaining device for the oil. Only a small part of the oil is entrained with the fiber 16 out of the tank 5. Arranged after the diaphragm 20 is the belt drawing-off device 22, which comprises two counter-running belts, which have a smooth coated surface in order to prevent damage to the fiber 16.

Arranged following after the belt drawing-off device 22 is a first deflecting roller 24. Oil which has also come out through the diaphragm 20, drips onto the deflecting roller 24 and is collected by a collecting tank 48. From this, the oil is pumped back into the drawing tower 4 by means of an oil pump 50, again in a regulated manner. The fiber 16 leaving the drawing tower 4 is still wetted with the oil O.

Figure 4:
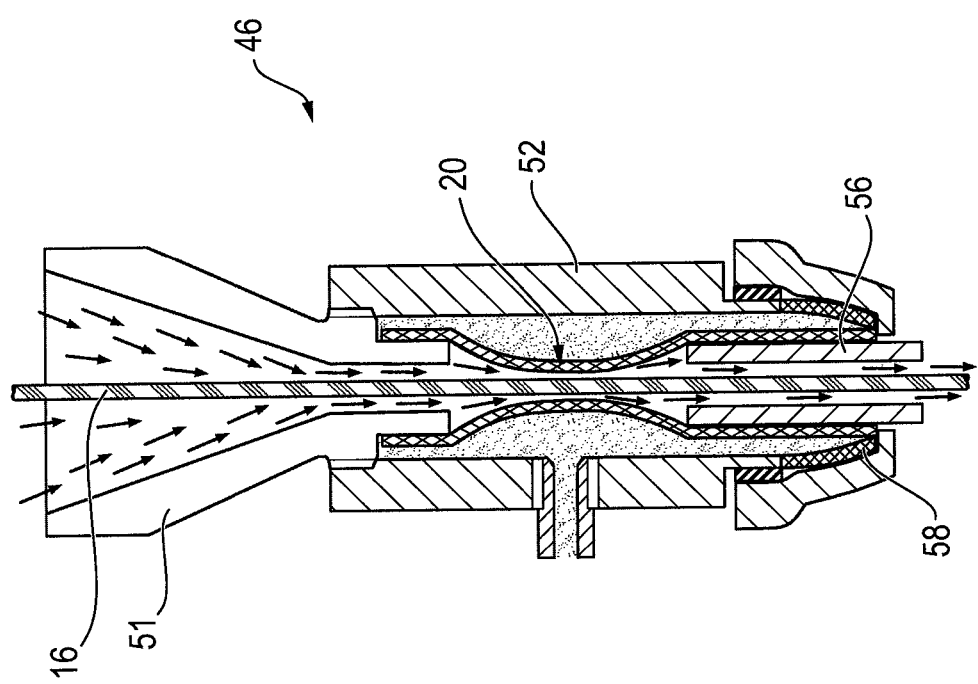
FIG. 4 shows a detailed representation of a diaphragm.

The structure of the outlet lock 46 can be seen in detail in FIG. 4. The outlet lock 46 is formed, in particular, as a dynamic, self-regulating diaphragm device, which adapts itself in each case to the current diameter of the fiber, in order as far as possible to achieve a good retaining effect. The outlet lock 46 is formed as a structural unit, in particular an exchangeable structural unit, which comprises at its upper end a funnel 51, which can be connected in an exchangeable manner to the tank 5. This is followed by a pressure chamber 52, which can, for example, be screwed on and can be subjected to a preferably inert compressed gas by way of a pressure connecting piece. Inside the pressure chamber 52, a predeterminable pressure can therefore be set. The outlet opening of the funnel 46 is followed by an elastic tube as the actual diaphragm 20, which on account of its elasticity is pressed against the surface of the fiber 16 by the pressure prevailing in the pressure chamber 52. In the lower region, the tube is fitted over a supporting sleeve 56, through which the fiber 16 leaves the diaphragm 20 again. The pressure chamber 52 is sealed with respect to the supporting sleeve 56 by way of an additional sealing lip 58.

Figure 5:
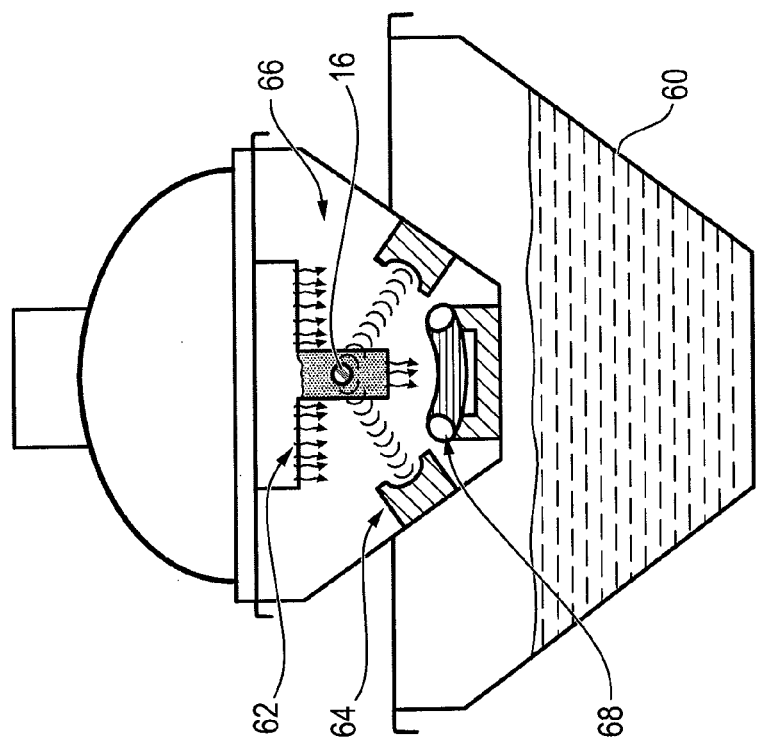
FIG. 5 shows a detailed representation of a cleaning device.

The two cleaning devices 8, 10 have, for example, the structure represented in FIG. 5. According to this figure, a collecting reservoir 60 is provided below the fiber 16. Above the fiber 16, the respective cleaning liquid is brought onto the fiber 16 from above. This takes place, for example, by the cleaning liquid falling onto the fiber 16 by way of an overflow edge 62. Also provided are ultrasound transducers 64, which are directed at the fiber 16. The focal point of the concavely formed ultrasound transducers 64 is located in the fiber 16. The ultrasound transducers 64 are in this case arranged within an overflow reservoir 66. A heating element 68, formed for example as a tubular heat exchanger, is provided in the lower region of the overflow reservoir 66 for heating the cleaning liquid. Arranged above the overflow reservoir 66 there is also a suction removal device.

The individual devices described in more detail in FIGS. 2 to 5 to supplement the overall apparatus in FIG. 1 each have when considered for themselves—and also independently of one another—their own inventive solution concepts, including individual details.

Figure 6:
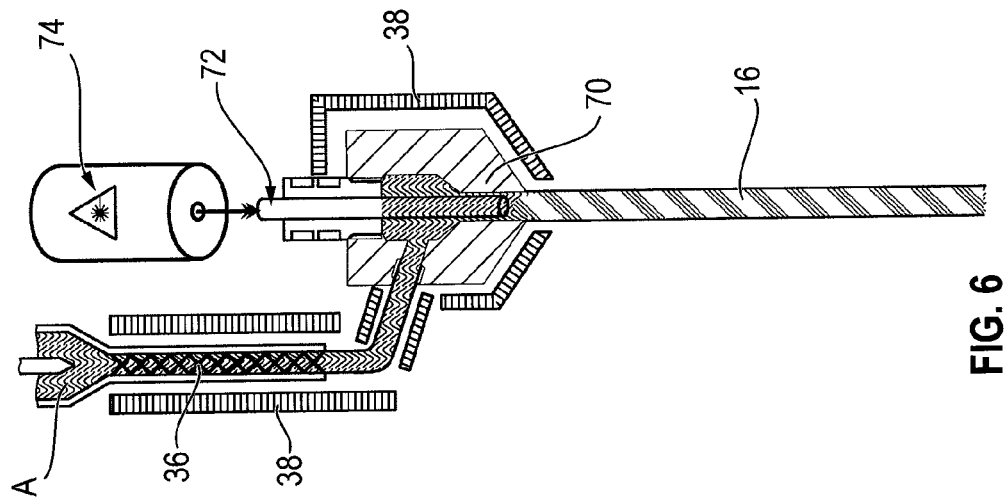
FIG. 6 shows a detailed representation of an alternative apparatus for producing an optical fiber with the aid of laser light.

As an alternative to the crosslinking in the drawing tower 4, according to the exemplary embodiment that is shown in FIG. 6, crosslinking with the aid of high-energy light, namely with the aid of laser light, is provided. The reactive starting material A, mixed in a way corresponding to the desired mixing ratio, is fed laterally to a special die 70. Introduced vertically from above into the die 70 is an optical waveguide 72, which reaches almost up to the die outlet orifice. Here, too, both the mixer 36 and the die 70 are surrounded by the temperature-controlling device 38 to prevent premature crosslinking.

The optical waveguide 72 is arranged coaxially in relation to the die orifice, so that the viscous starting material A is forced out through the die orifice in an approximately annular form around the optical waveguide 72, and subsequently forms the fiber strand. During operation, laser light is coupled from a laser 74 directly into the fiber strand axially by way of the optical waveguide 72, so that, as a result of the laser light, the crosslinking begins directly after the outlet orifice of the die 70. The fiber 16 forming after the die 70 is guided under a protective atmosphere, for example under an argon atmosphere. Already after a short distance, the fiber 16 is completely crosslinked, so that subsequent treatment steps are no longer absolutely necessary. If required, an additional maturing process with suitable storage at elevated temperature may also be provided here.

The shaping of the fiber 16 to the desired diameter required is defined here by the die geometry on the outlet side of the die 70.

Various single-component or multi-component reactive material systems can be used as the reactive starting material A. Polyurethane-based material systems have been found to be particularly suitable. These exhibit good technical processability in a technical respect with the processes described above, and at the same time allow continuous production with consistently high quality.

A two-component polyurethane system is preferably used, comprising a polyol with preferably low molecular weight (<10 000 daltons) and an oligomeric polyisocyanate. The functional groups taking part in the crosslinking reaction are hydroxyl groups (OH), as far as the polyol is concerned, and NCO groups, as far as the polyisocyanate is concerned. The crosslinking reaction here is an addition reaction, which has the advantage that no decomposition products or byproducts are produced. As far as the polyisocyanates are concerned, preferably polyisocyanates based on hexamethylene diisocyanate (HDI) are preferably used. On account of the aliphatic structure, this crosslinking agent has better light resistance, by contrast with the aromatic polyisocyanates, which have a tendency to become yellow. Furthermore, polyisocyanates based on linear HDI lead to very flexible material properties, as are required for the fiber in question here (bending radii, lower glass transition temperature).

Since polyisocyanates based on aromatic diisocyanates tend to become yellow and, on account of a bulky ring structure, lead to a rather inelastic material, aromatic polyisocyanates are less suitable. Polyisocyanates based on cycloaliphatic diisocyanates also lead to a rather inelastic material on account of the bulky structure and are therefore rather unsuitable. In particular also with regard to good resistance with respect to a thermo-oxidative aging at temperatures>70° C., aliphatic polyisocyanates with an isocyanurate structure based on hexamethylene diisocyanate are preferably used.

As far as the polyols are concerned, the polyols that are usually used for polyurethane systems are used. Since the polyol component influences the elastic properties of the polyurethane, polyols with two or three hydroxyl groups per molecule are preferably used.

In general, the formulation and composition of the polyol starting components can be freely formed. For example, on the basis of low molecular weight polyols or amines, so-called chain extenders may be added. Polyol mixtures with different structures, molecular weights or functionalities may also be used. However, it is important that these starting components are made to match one another in their functionality and polymer structure in such a way that the reactive functional groups ideally crosslink completely, that is to say stoichiometrically, with one another. For the formation of an ideal network, for example, a linear polyol may be crosslinked with a branched polyisocyanate.

During the crosslinking reaction, the formation of many crosslinking points may occur in a short time within the course of an initial crosslinking, whereby the mobility of the polymers is greatly restricted, which has the effect that complete crosslinking can then only be achieved with difficulty and in actual fact a network with so-called defects, that is to say unoccupied functional NCO or OH groups, is produced. These unoccupied functional groups may in the long term lead to an impairment of the light guiding properties of the fiber and increase the yellowing tendency.

In order to avoid these defects or remove them again, deliberately low molecular weight reactive molecules or monols are preferably admixed. On account of their small molecule size, these have molecularly a high mobility and can therefore crosslink such defects again. Alternatively, the fiber may also be post-treated during the production process, or subsequently, with suitable monofunctional or bifunctional molecules. This may be performed, for example, in a carrier solvent, with which the molecules penetrate into the interior of the fiber. Subsequently, the carrier or the solvent is then removed again.

As an alternative or in addition, a superstoichiometric formulation is deliberately made up, in order to have a surplus of functional groups, which are subsequently crosslinked with a selected reactive material. For example, after the actual production of the fiber, the surface of the fiber is fluorinated, for example with fluoropolyols. As a result, the fiber is better protected with regard to the chemical and thermal resistance and/or a cladding layer is formed in this way. A cladding layer is generally used in the case of conventional optical fibers for obtaining total reflection at the interface, so that, as far as possible, one hundred percent light propagation takes place within the optical waveguide fiber.

With the preferred intended use envisaged here for the elastomeric optical fiber, exploiting the so-called evanescent field, however, a cladding-free optical fiber is specifically intended.

In order to speed up the crosslinking reaction, a catalyst is preferably also admixed with the polyol. Furthermore, antioxidants and stabilizers are provided as additives, in order to protect the fiber from thermo-oxidative degradation.

Apart from polycaprolactones, polyester-polyether-polycarbonate polyols/polycarbonate diols or fluorinated polyether polyols or mixtures of these mentioned polyalcohols as a resin component are also used as polyols. Monomeric diols or higher-valent low molecular weight alcohols may also be used as chain extenders or crosslinking centers, in order to increase the strength/hardness, as well as monols, in order to post-crosslink uncrosslinked isocyanate groups. Furthermore, polyhydroxyl compounds with primary and secondary or tertiary hydroxyl groups may also be mixed in, in order to increase the crosslinking density, and consequently also the strength properties, and influence the material properties (tensile strength, extension, hardness, etc.).

For example, the structure of the polyol and of the polyisocyanate (linear or branched) has an influence on the formation of the network structure and on the material properties such as tensile strength, extension, hardness, etc., of the fiber. In the case of a low-valent polyol, for example, the number of three or more hydroxyl groups may have the effect that, in spite of a linear molecular structure, a crosslinked polymer structure is produced. Furthermore, the molecular weight of the polyols and polyisocyanates with primary reactive groups influences the material properties, since the crosslinking points decrease with increasing molecular weight, and vice versa.

The ratio of the component that forms the "hard" component of the material (this may be the curing agent, such as for example the polyisocyanate, or else chain extenders, such as short-chain diols, such as butane diol) has an effect on the material properties similar to that of the component that forms the "soft" material (generally the polyol). With an increasing proportion of "hard" components, generally the glass transition temperature and the elongation at break decrease while the tensile strength at break and the Shore hardness increase.

A trivalent alcohol, in particular based on a polycaprolactone, is expediently used as the polyol. The average molecular weight lies in the region of approximately 540. Furthermore, primary OH groups are present. On account of the trivalent functionality, and the associated branch Y structure, this polyol contributes to the formation of the spatial network. The properties of the fiber, such as for example the position of the glass transition temperature, the extension value and strength properties, are also influenced by way of the structure of the polyol (polycaprolactone polymer), namely whether linear or branched, the molecular weight and, associated with this, the reactivity coefficient, namely the content of OH groups. For instance, a branched polyol structure and a high reactivity coefficient (in the case of polycaprolactones synonymous with a low molecular weight), shifts the glass transition temperature upward. The elongation at break decreases and the tensile strength at break increases. A linear bivalent polycaprolactone polyol has an elastifying effect, i.e. the glass transition temperature is shifted downward and the elongation at break generally increases, while the tensile strength at break decreases. Very elastic material properties with a low glass transition temperature and high extension properties can be set with long-chain, linear polyols and, associated with this, low crosslinking density (greater molecular weight and few crosslinking points). Therefore, it can be stated generally that the selection of the starting components provides a great freedom of design with regard to the setting of both mechanical properties and optical properties of the optical fiber.

The structure, functionality and reactivity of the polyols and polyisocyanates are generally selected and made to match one another in such a way that, after the crosslinking, a three-dimensionally crosslinked polymer structure is obtained, without any formation of crystalline regions, which act in the fiber as diffusing centers when light is coupled in, and increase the attenuation.

Two examples of formulations for a two-component optical fiber based on a polyurethane system are given below:

Component A1:

98.34% by weight resin component (polyol), namely trivalent polyol based on polycaprolactone with primary OH groups; hydroxyl value 310 mg KOH/g, average molecular weight of about 540, for example known under the trade name "Capa 3050" from the Solvay company, 1.1% by weight additive component, namely a multifunctional stabilizer against thermo-oxidative degradation, for example the product obtainable under the trade name "Irganox 1726" from the company Ciba Specialty Chemicals, 0.55% by weight catalyst, namely a tin catalyst based on dimethylbis((loxoneodecyl)oxy)stannane.

Component A2 (polyisocyanate):

100% by weight of the curing agent that is known, for example, under the trade name "Desmodur N100", with an NCO content of approximately 22%.

The two components A1, A2 are mixed together with an approximate mixing ratio of 100:114. Here, the proportion of the stabilizer as a proportion by weight of the component A may be between 1 and 5% and the proportion by weight of the catalyst as a proportion of the component A1 may be between 0.3 and 1% by weight. Determinative for the crosslinking are the so-called reaction coefficients, that is in the case of the isocyanate the content of the isocyanate groups, in % by weight, and in the case of the polyol the content of hydroxyl groups, given as a KOH value (mg/g). These reactivity coefficients may vary within certain ranges with each supplied batch of the resin component or the curing agent. With the formation specified above, a hydroxyl value in the range between 310 and 320 KOH (mg/g) and an isocyanate content in the range from 21 to 22% were assumed. If these reactivity coefficients deviate in the case of the respective batches, a corresponding correction of the amounts weighed in is required, so that in principle a molar degree of crosslinking of the NCO groups to the OH groups in the range of 1.3:1 to 0.9:1 is set. A degree of conversion/degree of crosslinking of 1.1:1 (NCO/OH) has proven to be particularly advantageous.

An optical fiber produced with such a formulation is suitable in particular for the continuous production process with reference to FIGS. 1 to 5, and similarly also for the continuous production process described with reference to FIG. 6. An optical fiber formed in this way has an elongation at break of more than 100%. The maximum tensile stress is approximately 80 MPa. The glass transition temperature (DSC) lies in the range between 20° and 30° C. and the optical attenuation for a laser wavelength of 632 nm at room temperature lies below 3 dB/m.

As an alternative to the continuous production process, it is also possible in principle to use a discontinuous production process, in which the reactive components are, for example, introduced into a tube or else into a mold and crosslinked there, before the mold is subsequently opened or the tube is removed again. In the case of such a formulation, the component A1 is made up, for example, of 98.5% of the resin component specified in the case of the above formulation and approximately 1.5% of the additive component. Here it is therefore possible to dispense with the admixing of a catalyst. The curing agent component is the same as in the above formulation.

Such an elastomeric optical fiber made of plastic based on a polyurethane system has an operating temperature range far above 100° C. Generally, such a polyurethane elastomer has a very high elongation at break. In comparison with conventional thermoplastic amorphous optical waveguides, much smaller bending radii can be realized with such an elastomeric light guide, so that the optical fibers can also be laid in an extremely confined space. On account of the crosslinking points, the elastomeric optical fibers are also much less sensitive to the formation of stress cracks. On account of the crosslinking, the optical waveguide does not melt, even at relatively high temperatures, but goes over directly into material decomposition. Generally, the optical attenuation of the elastomeric optical fiber lies in the range between 2 and 5 dB/m for a light wavelength of approximately 630 nm. It is consequently possible without any problem to achieve transmission distances of up to several meters, which is entirely adequate for the intended application areas, for example in automobile technology. In particular, the optical fiber is used in the area of sensor technology. The optical fiber may also be used with cladding for signal data transmission over short distances. Furthermore, the optical fiber may of course be used for lighting purposes, etc.

As an alternative to the system described here, in which the starting material A is introduced downwardly from above, it is also possible in principle for the starting material A to be injected from below into a supporting liquid. In this case, the supporting liquid must have a greater density than the starting material. In principle, the starting material may also be introduced horizontally into the reaction device.

LIST OF DESIGNATIONS 2 metering device
4 drawing tower
5 tank
6 post-crosslinking device
8 first cleaning device
10 second cleaning device
12 drying device
14 winding-up device
16 fiber
18 die
20 diaphragm
22 belt drawing device
24 deflection roller
26 reel
30 storage tank
32 metering pump
34 metering head
36 mixer
38 temperature-controlling device
40 level sensor
42 heating jacket
44 gelling region
46 funnel
48 collecting tank
50 oil pump
51 funnel
52 pressure chamber
56 supporting sleeve
58 sealing lip 60 collecting reservoir
62 overflow edge
64 ultrasound transducer
66 overflow reservoir
68 heating element
70 die
72 optical waveguide
74 laser
A starting material
A1, A2 reactive component
H filling level

The invention claimed is:

1. A method of producing an elastomeric optical fiber, the method which comprises:
   mixing a plurality of reactive starting components in a predetermined composition in a metering device to form a viscous reactive starting material formed of first component (A1) made up of 98.34% by weight of a trivalent polyol based on polycaprolactone, 1.1% by weight of an additive component, and 0.55% by weight of a catalyst, and of a second component being a commercially available polyisocyanate with an NCO content of 22%;
   providing a reaction device containing a liquid that is inert with respect to the reactive starting material;
   passing the viscous reactive starting material to and through a nozzle die to form a fiber from the reactive starting material, and guiding the fiber into the reaction device;
   cooling the reactive starting material until the starting material reaches the reaction device, and at least partially crosslinking the starting material in the reaction device.

2. The method according to claim 1, wherein the starting material moves downward in the reaction device under its own weight over a drop height of several meters and the starting material is slowed down by the liquid.

3. The method according to claim 1, which comprises tempering the liquid.

4. The method according to claim 1, wherein the liquid is an oil with a lower density than a density of the starting material.

5. The method according to claim 1, which comprises, after partial crosslinking, actively drawing the fiber to a desired final diameter.

6. The method according to claim 1, which comprises drawing the fiber through a diaphragm in an end region of the reaction device and the diaphragm is adapted to the diameter of the fiber.

7. The method according to claim 6, wherein the diaphragm can be dynamically set.

8. The method according to claim 6, wherein the diaphragm comprises an elastically deformable tube that can be subjected to pressure from the outside and that lies against the fiber.

9. The method according to claim 6, which comprises providing a belt drawing device having counter-circulating belts with a smooth surface following the diaphragm, and gripping the fiber between the belts and drawing the fiber.

10. The method according to claim 1, which comprises, following the reaction device, post-crosslinking the partially crosslinked fiber and cleaning the fiber, and thereby selecting one or a combination of the following steps:
    drawing the fiber through a heated bath for further crosslinking;
    drawing the fiber through a heated cleaning device for cleaning;
    rinsing the fiber in the cleaning device by continuous circulation of a rinsing liquid, and optionally exposing the fiber to the effect of ultrasound;
    drying the fiber under negative pressure; and
    storing the fiber until complete crosslinking occurs.

11. The method for producing an optical fiber according to claim 1, the method which comprises:
    drawing the fiber from the viscous reactive starting material and shaping the starting material by way of the nozzle die; and
    introducing laser light longitudinally into the nozzle die and thereby crosslinking the starting material with the aid of the laser light to form an plastic fiber.

12. The method for producing an optical fiber according to claim 1, which comprises:
    providing the viscous starting material in the form of a reactive, spatially crosslinkable polyurethane system, namely a 2-component system with a polyol and a polyisocyanate as a crosslinking agent, the crosslinking taking place by way of a polyaddition reaction of the functional group of the polyol with the functional group of the polyisocyanate and a molar ratio of the functional groups NCO:OH lying in the range between 1.3:1 and 0.9:1; and
    drawing the fiber from the viscous reactive starting material and crosslinking the starting material.

13. The method according to claim 12, which comprises setting the molar ratio of the functional groups NCO:OH at 1.1:1.

14. A method of producing an optical fiber from plastic, which comprises:
    providing a viscous starting material in the form of a reactive, spatially crosslinkable polyurethane system, namely a 2-component system with a polyol and a polyisocyanate as a crosslinking agent, the 2-component system having a first component (A1) made up of 98.34% by weight of a trivalent polyol based on polycaprolactone, 1.1% by weight of an additive component, and 0.55% by weight of a catalyst, and a second component that is a commercially available polyisocyanate with an NCO content of 22%, the crosslinking taking place by way of a polyaddition reaction of the functional group of the polyol with the functional group of the polyisocyanate and a molar ratio of the functional groups NCO:OH lying in the range between 1.3:1 and 0.9:1; and
    drawing a fiber from the viscous reactive starting material and crosslinking the starting material.

15. The method according to claim 14, which comprises setting the molar ratio of the functional groups NCO:OH at 1.1:1.

16. The method according to claim 14, wherein the polyol is a trivalent alcohol based on a polycaprolactone.

17. The method according to claim 14, wherein the polyol is a mixture of low molecular weight polyols and higher molecular weight polyols.

18. The process is claimed in claim 14, which comprises formulating the components superstoichiometrically and admixing an additional reactive crosslinking agent.

19. The method according to claim 14, which comprises fluorinating a surface of the fiber.

20. The method according to claim 14, which comprises admixing a catalyst to speed up a crosslinking reaction.

21. The method according to claim 20, which comprises admixing the catalyst in a range from approximately 0.3 to 1% by weight with respect to a proportion of the polyol component.

22. The method according to claim 14, which comprises admixing an additive against thermo-oxidative degradation.

23. The method according to claim 22, which comprises admixing the additive in a range from approximately 1 to 5% by weight with respect to a proportion of the polyol component.

24. The method according to claim 14, which comprises blocking at least one component of the starting material prior to an onset of the crosslinking.

25. An optical fiber, comprising:
   an elastomeric plastic in the form of a three-dimensionally crosslinked 2-component polyurethane system, the polyurethane system having a functional group of a polyol crosslinked in a polyaddition reaction with a functional group of a polyisocyanate, the 2-component polyurethane system including a first component (A1) made up of 98.34% by weight of a trivalent polyol based on polycaprolactone, 1.1% by weight of an additive component, and 0.55% by weight of a catalyst, and a second component being a commercially available polyisocyanate with an NCO content of 22%; and
   wherein a molar ratio of the functional groups NCO:OH lies in the range between 1.3:1 and 0.9:1.

26. The optical fiber according to claim 25, wherein said molar ratio of NCO:OH is 1.1:1.

27. The optical fiber according to claim 25 produced by the method according to claim 1.

28. The optical fiber according to claim 25, wherein said polyol is a trivalent alcohol based on a polycaprolactone.

* * * * *